United States Patent [19]
Yamaguchi et al.

[11] Patent Number: 5,986,793
[45] Date of Patent: Nov. 16, 1999

[54] OPTICAL APPARATUS

[75] Inventors: Masao Yamaguchi, Funabashi; Takashi Shiraishi, Kawasaki; Yasuyuki Fukutome, Tokyo, all of Japan

[73] Assignee: Kabushiki Kaisha Toshiba, Kawasaki, Japan

[21] Appl. No.: 09/133,535

[22] Filed: Aug. 13, 1998

[30] Foreign Application Priority Data

Aug. 14, 1997 [JP] Japan .................................. 9-219434

[51] Int. Cl.⁶ .................................................. G02B 26/08
[52] U.S. Cl. ......................... 359/216; 359/204; 359/217; 359/218; 359/219
[58] Field of Search .................................. 359/216–219, 359/204, 819, 820; 347/241–244, 257–261

[56] References Cited

U.S. PATENT DOCUMENTS 4,720,168  1/1988  Kaneko ................................ 359/218
4,815,059  3/1989  Nakayama et al. ................. 359/820
5,124,830  6/1992  Omura et al. ....................... 359/219
5,673,136  9/1997  Inoue et al. ......................... 359/205

*Primary Examiner*—James Phan
*Attorney, Agent, or Firm*—Foley & Lardner

[57] ABSTRACT

An optical apparatus has a holder which integrally holds a light source for emitting a divergent beam, and a finite focus lens (or a collimator lens) for converting the divergent beam to a convergent one (or a parallel one). The holder is made of a material having a linear expansion coefficient which can cause change of the distance between the light source and the finite focus lens so as to correct a change in the focal distance of the lens. When there is a change in temperature, the holder changes the distance between the light source and the finite focus lens by an amount corresponding to the change in temperature, thereby correcting that shift in the image forming position of the finite focus lens, which is caused by the change in temperature.

4 Claims, 10 Drawing Sheets

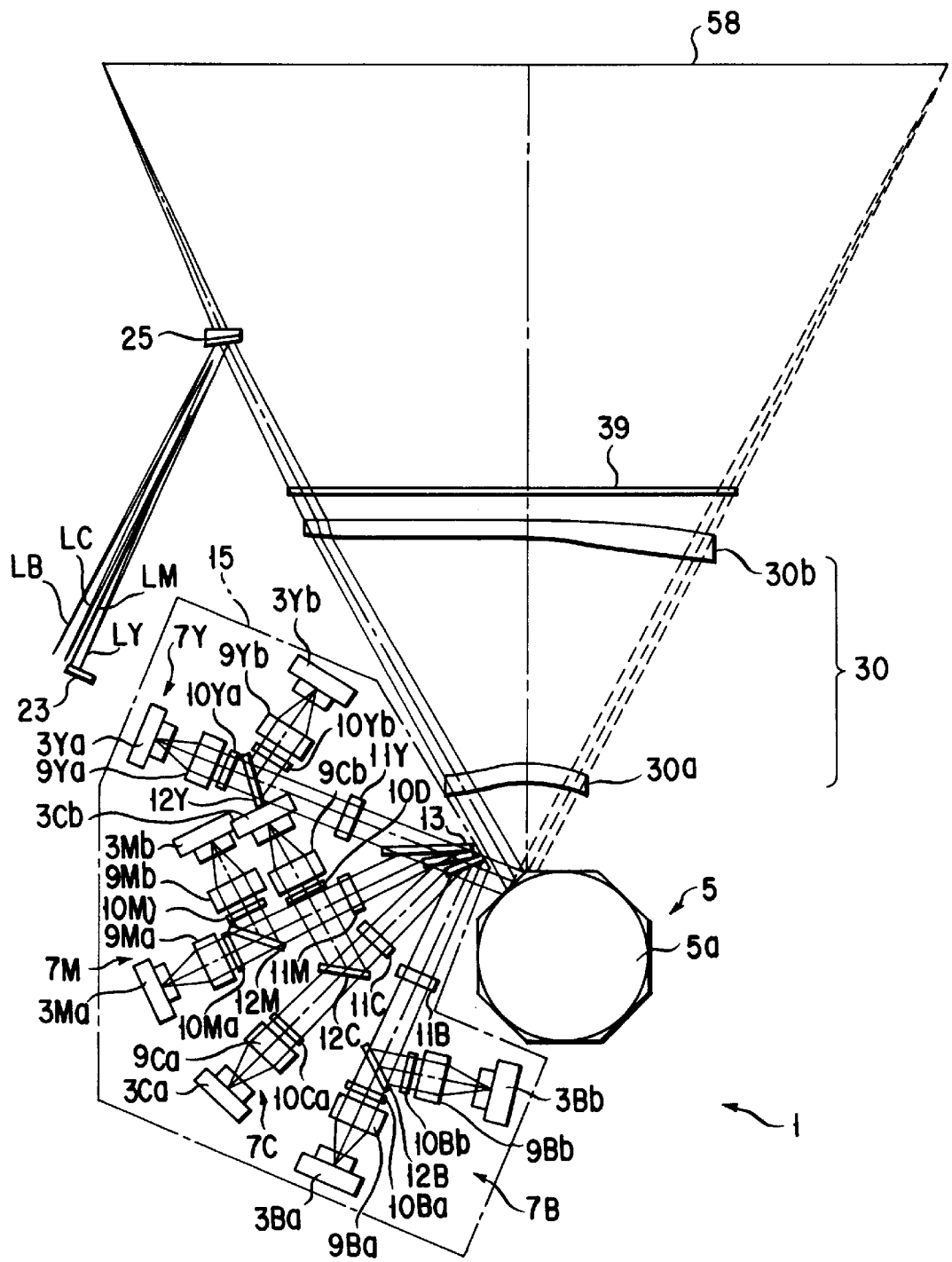
F I G. 1

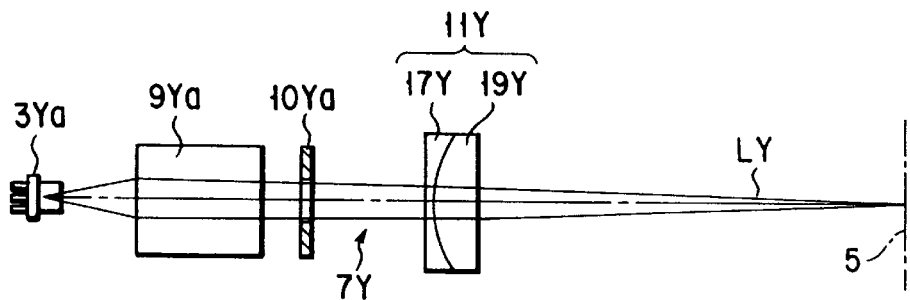
FIG. 2
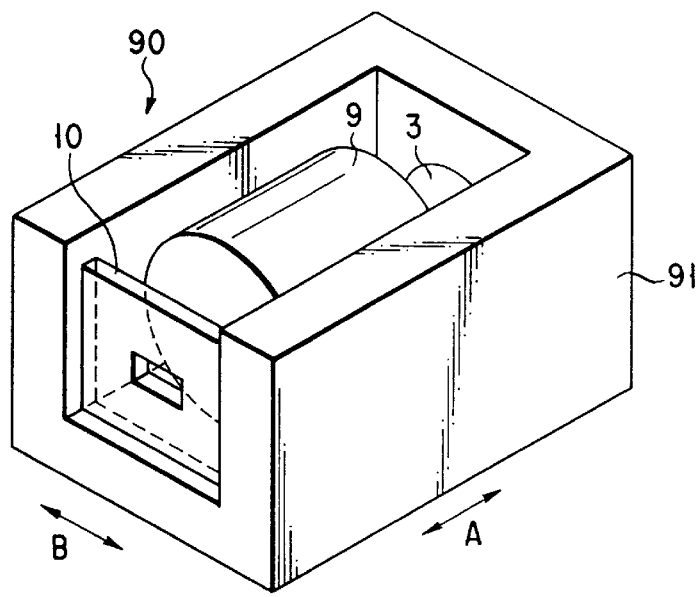
FIG. 3A
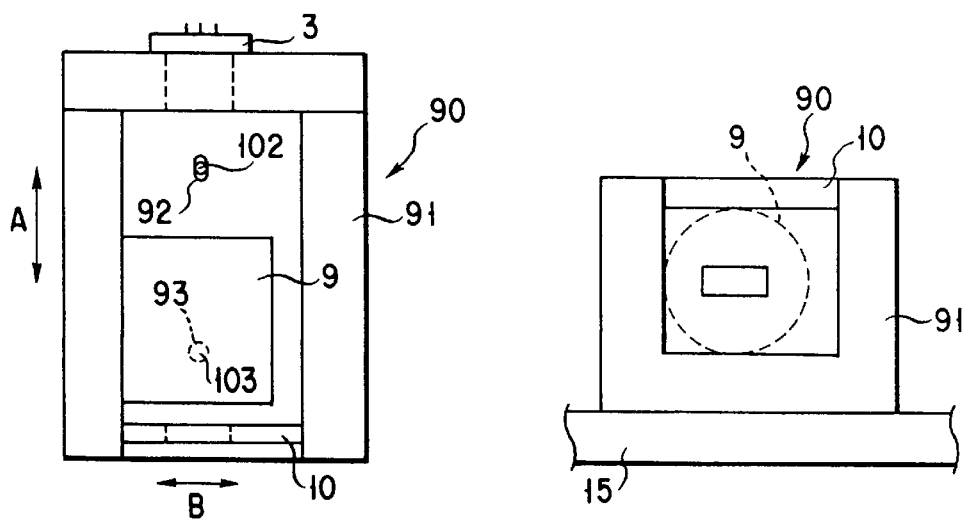
FIG. 3B
FIG. 3C

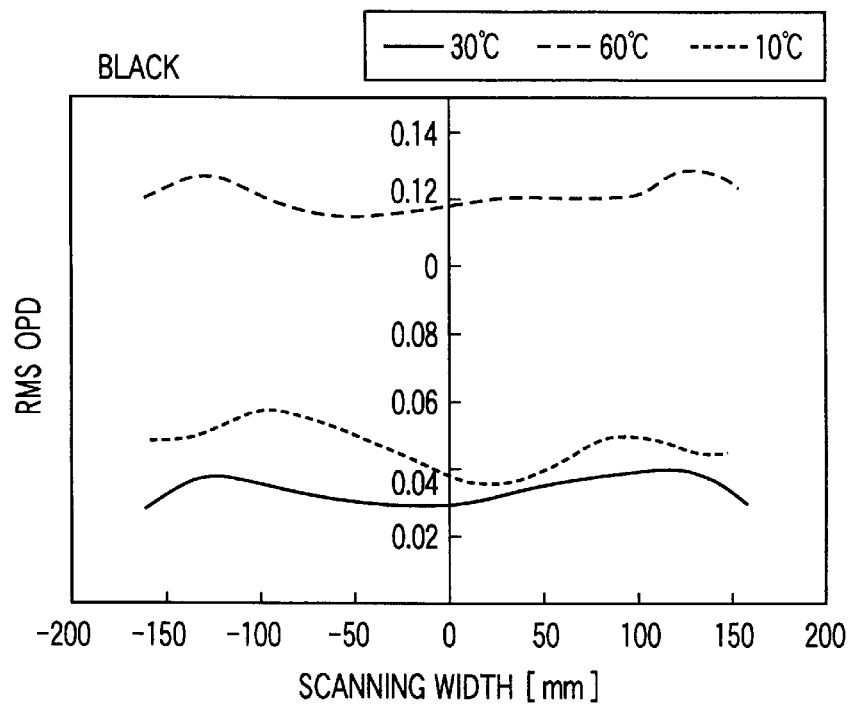
F I G. 4A
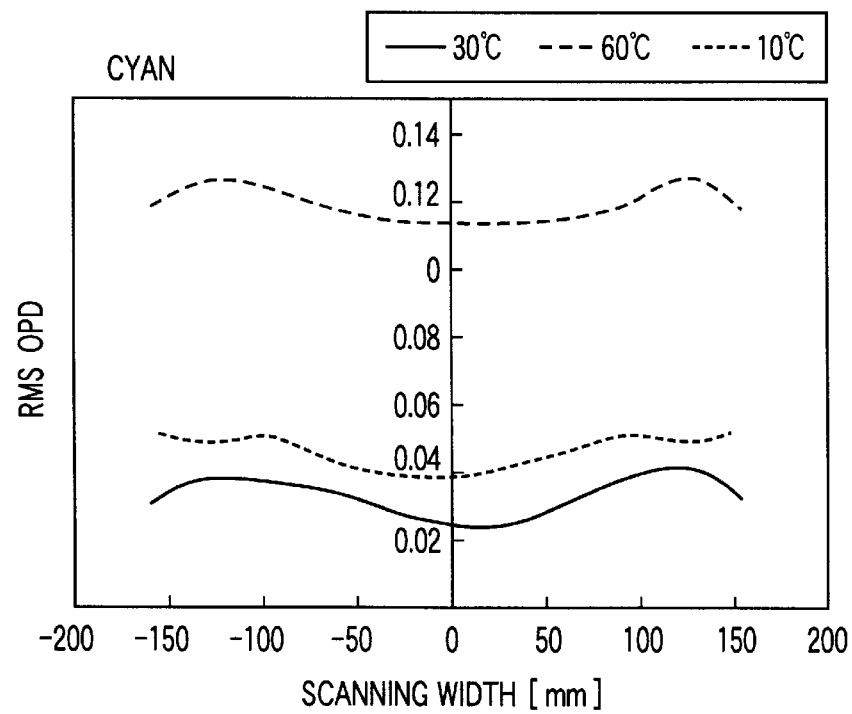
F I G. 4B

OPTICAL APPARATUS

BACKGROUND OF THE INVENTION

This invention relates to an optical apparatus, more particularly to a multi-beam optical scanning apparatus for performing scanning using plural beams, which is applicable to an image forming apparatus such as a color printer of a tandem type, a color copy machine of a tandem type, a high-speed laser printer and a digital copy machine, which have plural photosensitive drums.

Image forming apparatuses, such as color printers of a tandem type or color copy machines of a tandem type, which have plural photosensitive drums, each incorporate image forming sections corresponding to color components resulting from color separation, and an optical scanning apparatus, i.e. a laser exposure apparatus, for emitting plural laser beams associated with image data items for corresponding color components.

It is known that those image forming apparatuses include ones which have plural optical scanning devices associated with corresponding image forming sections, and ones which have a single optical scanning device adapted to emit plural laser beams to corresponding image forming sections.

In general, the optical scanning apparatus comprises plural semiconductor laser elements as a light source; a first lens group, i.e. a pre-deflection optical system, for converging beams emitted from the laser elements, to a predetermined diameter; a light-deflecting unit for continuously reflecting the beams converged by the first lens group, to a predetermined portion (i.e. an image surface) of a recording medium which is situated in a main scanning direction perpendicular to a sub-scanning direction in which a recording medium is transferred; and a second lens group, i.e. a post-deflection optical system, for converging the laser beams deflected by the light-deflecting unit so that the image surface of the recording medium will coincide with a line on which the laser beams are actually converged.

The pre-deflection optical system of the optical scanning apparatus includes a semiconductor laser, and a finite focus lens for converging a divergent beam emitted from the semiconductor laser, to a predetermined diameter, or a collimator lens for converting the laser beam to a parallel beam.

When the image forming apparatus with the optical scanning apparatus is used at a high temperature or a low temperature, or when the temperature of the image forming apparatus rises due to the heat generated therein, each lens in it may well be influenced by the heat. In this case, it is possible that the refraction index of the lens will vary to thereby vary its focal distance. A change in focal distance, due to a change in the refraction index of the finite focus lens or collimator lens for converging the divergent beam emitted from the semiconductor laser or converting it to a parallel beam, will increase the beam-spot diameter on a photosensitive drum incorporated in the image forming apparatus, thereby degrading the quality of an image formed on the drum.

In other words, the laser beam emitted from each semiconductor laser is usually converged by a group of lenses to a minimum diameter in an image formation position, i.e. on the photosensitive drum. However, if the focal distance of each lens increases or decreases to shift the focus from the image formation position, the beam-spot diameter on the photosensitive drum will increase, with the result that an image of a high resolution and quality cannot be obtained.

Moreover, in a multi-beam optical system for simultaneously deflecting plural laser beams, the corresponding light sources, finite focus lenses or collimator lenses are located in respective positions of different temperatures. Accordingly, the focal distance of each lens varies due to a change in ambient conditions, in particular, temperature, and hence the beam-spot diameters on the photosensitive drum will vary. As a result, the properties of the optical system will degrade, thereby degrading the quality of an image formed.

BRIEF SUMMARY OF THE INVENTION

This invention has been developed to solve the above problem and is aimed at providing an optical apparatus capable of forming an image of high resolution and quality.

To attain the aim, there is provided an optical apparatus comprising:

a light source for emitting a divergent beam;

a first optical member for converting the divergent beam to a convergent beam or a parallel beam;

holding means for integrally holding the light source and the first optical member;

a second optical member for converging the beam from the first optical member in a first direction;

deflecting means including a plurality of rotatable reflecting surfaces for deflecting the beam having passed the second optical member to those portions of a predetermined image surface, which are situated in a second direction perpendicular to the first direction; and image forming means for causing the beam deflected by the deflecting means to scan the predetermined image surface at a constant speed;

wherein the following equations are satisfied:

$$\left| K_m \left[ \frac{L_{GI}}{f} \left\{ -\frac{1}{n-1}\left(\frac{\partial n}{\partial T} + \frac{\partial n}{\partial \lambda} \cdot \frac{\partial \lambda}{\partial T}\right) + \alpha_G \right\} - \alpha_u \right] L_{GI} \right| \leq 0.0694 \frac{\omega_m^2}{\lambda} \quad (A)$$

$$\left| K_s \left[ \frac{L_{GI}}{f} \left\{ -\frac{1}{n-1}\left(\frac{\partial n}{\partial T} + \frac{\partial n}{\partial \lambda} \cdot \frac{\partial \lambda}{\partial T}\right) + \alpha_G \right\} - \alpha_u \right] L_{GI} \right| \leq 0.0694 \frac{\omega_s^2}{\lambda} \quad (B)$$

where
f represents a focal distance of the first optical member, $L_G$ a distance between the light source and a front-side principal point of the first optical member, n a refractive index of the first optical member, $\alpha_G$ linear expansion coefficient of the first optical member due to a temperature change, $\alpha_U$ linear expansion coefficient of the holding means due to a temperature change, $\lambda$ a wavelength of the light source, Km a second directional axial magnification of the entire optical apparatus, Ks a first directional axial magnification of the entire optical apparatus, $\omega m$ a second directional beam radius on the predetermined image surface of 30° C., and $\omega s$ a first directional beam radius on the predetermined image surface of 30° C.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic plan view, showing optical members included in a multi-beam optical scanning apparatus according to the embodiment of the invention;

FIG. 2 is a fragmentary sectional view, obtained by cutting the optical scanning apparatus of FIG. 1 along the optical axis of a system interposed between a first optical source and a light-deflecting unit;

FIG. 3A is a perspective view, showing a finite lens unit or a collimator lens unit applied to the optical scanning apparatus of the embodiment;

FIG. 3B is a plan view of the unit shown in FIG. 3A;

FIG. 3C is a front view of the unit shown in FIG. 3A;

FIGS. 4A–4D are views, useful in explaining calculation results of wave front aberrations on the image surface of a second optical apparatus as a comparative;

DETAILED DESCRIPTION OF THE INVENTION

Figure 4C:
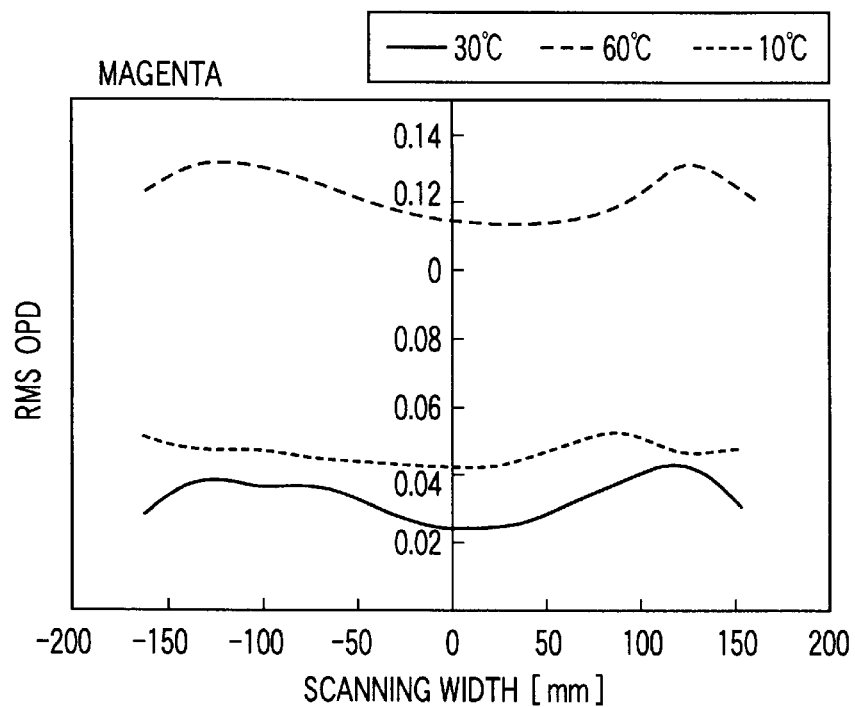

An optical apparatus according to the embodiment of the invention will be described in detail with reference to the accompanying drawings.

As is illustrated in FIG. 1, a multi-beam optical scanning apparatus 1 has a single light-deflecting unit 5 as deflecting means for deflecting, at a predetermined linear velocity, a laser beam emitted from each semiconductor laser element as a light source, to image surfaces 58 situated in predetermined positions. The direction in which the laser beam deflected by the light-deflecting unit 5 is converged on the photosensitive drum 58 will be referred to as a main scanning direction.

The light-deflecting unit 5 has a regular polygon mirror 5a with eight plane reflection surfaces, and a motor (not shown) for rotating the polygon mirror 5a at a predetermined speed. The polygon mirror 5a is made of, for example, aluminum. Each reflection surface of the polygon mirror 5a is formed by cutting a mirror material in a direction perpendicular to a plane which includes the direction of rotation of the mirror 5a, and then depositing a surface protective layer of e.g. $SiO_2$ on cut surfaces.

Between the light-deflecting unit 5 and the image surface, there is provided a post-deflection optical system 30 consisting of first and second image forming lenses 30a and 30b, which serve as image forming means for providing predetermined optical properties to a laser beam deflected in a predetermine direction by each reflection surface of the light-deflecting unit 5. Further, a single horizontally synchronizing sensor 23 is located in a position substantially corresponding to the image surface for sensing whether the laser beam L(Y, M, C, B) guided through the second image forming lens 30b of the post-deflection optical system 30 has reached a predetermined portion before an area from which an image is to be written. A horizontally synchronizing reflection mirror 25 is provided between the post-deflection optical system 30 and the horizontally synchronizing sensor 23 for reflecting part of the laser beam L(Y, M, C, B) having passed the second image forming lens 30b of the system 30, to the horizontally synchronizing sensor 23.

A pre-deflection optical system interposed between laser elements as light sources and the light-deflecting unit 5 will now be described in detail.

The optical scanning apparatus 1 has first through fourth light sources 3Y, 3M, 3C and 3B for generating laser beams corresponding to image data items concerning different color components resulting from color separation. Each of the first through fourth light sources includes first and second laser elements. Accordingly, the optical scanning apparatus 1 includes (4×2) laser elements.

More specifically, the first light source 3Y has a first laser 3Ya and a second laser 3Yb for generating laser beams to form a yellow (Y) image. Similarly, the second light source 3M has a first laser 3Ma and a second laser 3Mb for generating laser beams to form a magenta (M) image. The third light source 3C has a first laser 3Ca and a second laser 3Cb for generating laser beams to form a cyan (C) image. The fourth light source 3B has a first laser 3Ba and a second laser 3Bb for generating laser beams to form a black (B) image.

The laser beam LY emitted from the first light source 3Y is formed by synthesizing laser beams LYa and LYb emitted from the first and second lasers 3Ya and 3Yb, respectively. Similarly, the laser beam LM emitted from the second light source 3M is formed by synthesizing laser beams LMa and LMb emitted from the first and second lasers 3Ma and 3Mb, respectively. The laser beam LC emitted from the third light source 3C is formed by synthesizing laser beams LCa and LCb emitted from the first and second lasers 3Ca and 3Cb, respectively. The laser beam LB emitted from the fourth light source 3B is formed by synthesizing laser beams LBa and LBb emitted from the first and second lasers 3Ba and 3Bb, respectively.

Each of pre-deflection optical systems 7(Y, M, C, B) is interposed between a corresponding pair of the laser elements 3Y(a,b), 3M(a,b), 3C(a,b) and 3B(a,b) and the light-deflecting unit 5. The pre-deflection optical systems 7(Y, M, C, B) adjust the beam-spot shape of the laser beams LY(a,b), LM(a,b), LC(a,b) and LB(a,b), respectively.

One (7Y) of the pre-deflection optical systems 7(Y, M, C, B) will be described in more detail, using the laser beams Ya and Yb emitted from the first and second lasers 3Ya to the light-deflecting unit 5.

The divergent laser beam LYa emitted from the first laser 3Ya is converged by a finite focus lens or collimator lens 9Ya as a first optical element, and then its beam-spot shape is adjusted to a predetermined shape by an aperture 10Ya. The laser beam LYa having passed the aperture 10Ya is converged to a predetermined degree only in the sub-scanning direction by a hybrid cylinder lens 11Y as a second optical element, and guided to the light-deflecting unit 5.

A half mirror 12Y is inserted between the finite focus lens 9Ya and the hybrid cylinder lens 11Y at a predetermined angle to the optical axis.

The second laser 3Yb is obliquely opposed to that surface of the half mirror 12Y on which the laser beam LYa from the first laser 3Ya is incident, so that the laser 3Yb can provide a predetermined sub-scanning directional beam width to the laser beam LYa emitted from the first laser 3Ya. In other words, the laser beam LYb from the second laser 3Yb is synthesized with the laser beam LYa emitted from the first laser 3Ya, thereby forming substantially a single laser beam LY having a predetermined width in the sub-scanning direction. A finite focus lens 9Yb and an aperture 10Yb are provided between the second laser 3Yb and the half mirror 12Y for converging the laser beam LYb from the laser 3Yb to a predetermined degree.

The laser beams LYa and LYb, which have been synthesized, by the half mirror 12Y, into substantially a single laser beam LY having a predetermined width in the sub-scanning direction, pass a laser-synthesizing mirror unit 13 and reach the light-deflecting unit 5.

Similarly, between the first laser 3Ma and the laser-synthesizing mirror unit 13, there are provided, at predetermined locations, a finite focus lens 9Ma, an aperture 10Ma, a hybrid cylinder lens 11M, a half mirror 12M, the second laser 3Mb, a finite focus lens 9Mb and an aperture 10Mb. Between the first laser 3Ca and the laser-synthesizing mirror unit 13, there are provided, at predetermined locations, a finite focus lens 9Ca, an aperture 10Ca, a hybrid cylinder lens 11C, a half mirror 12C, the second laser 3Cb, a finite focus lens 9Cb and an aperture 10Cb. Further, between the first laser 3Ba and the laser-synthesizing mirror unit 13, there are provided, at predetermined locations, a finite focus lens 9Ba, an aperture 10Ba, a hybrid cylinder lens 11B, a half mirror 12B, the second laser 3Bb, a finite focus lens 9Bb and an aperture 10Bb.

The light sources 3(Y, M, C, B), the pre-deflection optical systems 7(Y, M, C, B) and the laser-synthesizing mirror unit 13 are situated on predetermined portions of a housing 15 made of, for example, a metal such as an aluminum alloy, or a resin.

The finite focus lenses 9(Y, M, C, B)a and 9(Y, M, C, B)b are constituted of an aspherical glass lens or a single lens formed by attaching a spherical glass lens to a UV-hardened plastic aspherical lens (not shown).

FIG. 2 is a sub-scanning directional fragmentary sectional view, showing an optical path between the laser element 3Ya of the pre-deflection optical system 7Y and the reflection surface of the light-deflecting unit 5 in a state in which the half mirror and the laser-synthesizing mirror unit are omitted. FIG. 2 shows only optical elements for the laser beam LYa.

The hybrid cylinder lens 11Y includes cylinder lenses 17Y and 19Y which have substantially the same curvature in the sub-scanning direction. The surfaces of the cylinder lenses 17Y and 19Y which are exposed to the air are formed substantially flat.

The cylinder lens 17Y is made of plastic such as PMMA (polymethyl methacryl). The cylinder lens 19Y is made of glass such as TaSF21.

Further, the hybrid cylinder lens 11Y is formed as one body by adhering the exit plane of the cylinder lens 17Y to the entrance plane of the cylinder lens 19Y, or pushing the cylinder lenses to a positioning member (not shown) in predetermined directions. Alternatively, the hybrid cylinder 11Y may be formed by molding the cylinder lens 17Y on the entrance plane of the cylinder lens 19Y.

The optical properties of the pre-deflection optical system 7 and the post-deflection optical system 30 will be described in detail.

The post-deflection optical system 30, i.e. the pair of first and second image forming lenses 30a and 30b, are made of plastic such as PMMA. Therefore, when the ambient temperature of the post-deflection optical system 30 varies between 0–50° C., the refractive index n of the first and second image forming lenses 30a and 30b varies between 1.4876–1.4789. In this case, the image forming surface on which the laser beam having passed the first and second image forming lenses 30a and 30b is converged, i.e. the sub-scanning directional image forming position of the laser beam, can vary by about ±12 mm.

To avoid this, lenses of the same material as the lenses of the post-deflection optical system are incorporated in the pre-deflection optical system 7 shown in FIG. 2, with its curvature optimized. As a result, the range of variations in the position of the image forming surface resulting from variations in the refractive index n due to temperature change is reduced to about ±0.5 mm. In other words, where the pre-deflection optical system 7 and the post-deflection optical system 30 includes lenses of the same plastic, i.e. PMMA, sub-scanning directional color aberration resulting from a change in the refractive index of each lens due to a change in its temperature can be corrected as compared with the conventional optical system which uses glass lenses in the pre-deflection optical system 7 and plastic lenses in the post-deflection optical system 30.

The first laser 3Ya, the finite focus lens 9Ya and the aperture 10Ya, which are included in the pre-deflection optical system of FIG. 2, are fixed in a holder with their positions optimized, thereby constituting a finite lens unit or a collimator lens unit. In other words, in this unit, the elements are fixed in the holder such that the lens and the aperture are separated from the laser by predetermined distances so as to provide an optimal beam diameter.

The other light sources individually constitute finite lens units or a collimator lens units together with elements associated therewith. Each unit is situated in a predetermined position in the housing of the optical scanning apparatus. Further, the laser, the finite focus lens (or the collimator lens) and the aperture are fixed in position in each unit holder with their positional relationship maintained.

Although two finite lens units (or two collimator lens unit) are provided for each color component, i.e. cyan, magenta, yellow and black, the laser, the finite focus lens (or the collimator lens) and the aperture included in one lens unit are similar to those included in another unit. Therefore, description will be given to the lens unit, attaching common reference numerals to common elements in the units. Specifically, the laser, the finite focus lens (or the collimator lens) and the aperture are denoted by reference numerals 3, 9 and 10, respectively.

A lens unit of a structure as shown in FIGS. 3A–3C is positioned and fixed on the housing 15 of the optical scanning apparatus 1. As is shown in FIGS. 3A–3C, a lens unit 90 is constituted of a semiconductor laser 3, a finite focus lens (or a collimator lens) 9 and an aperture 10 held integral by a holder 91. The holder 91 is formed of a metal such as aluminum.

The housing 15 of the optical scanning apparatus 1 is formed of, for example, plastic, and has two parallel pins 102 and 103 for positioning the lens unit 90. Two holes 92 and 93 to be engaged with the parallel pins 102 and 103 are formed in that bottom of the holder 91 of the unit 90 which contacts the housing 15.

The hole 92 has an inner diameter slightly larger than the outer diameter of the parallel pin 102, and is formed slightly longer in a first direction A parallel to the optical axis than in a second direction B (i.e. the hole is shaped elliptical). The hole 93 is shaped circular and has an inner diameter slightly larger than the outer diameter of the parallel pin 103.

Where the lens unit 90 constructed as above is placed on the housing 15, the holes 92 and 93 formed in the bottom of the holder 91 are engaged with the parallel pins 92 and 93 on the housing 15, thereby positioning and fixing the unit 90.

Referring then to FIG. 1, the operation of the optical apparatus, i.e. the optical scanning apparatus 1 will be described.

When the optical apparatus 1 is used at a high or low temperature, or when the temperature of the case of the apparatus increases due to heat generated within the apparatus, the refractive indexes or the shapes of the lenses included in the optical systems of the optical scanning apparatus 1 may well change. These changes will cause a change in the focal distance of each lens and hence degrade its optical properties. In particular, a change in the focal distance of a finite focus lens for converging a divergent laser beam emitted from a laser element will significantly affect the beam-spot diameter on the photosensitive drum, and adversely affect the quality of an image formed on the photosensitive drum.

A collimator lens cannot convert the divergent laser beam to a parallel beam. Therefore, it will significantly affect the beam-spot diameter on the photosensitive drum.

In addition, since in the above-described multi-beam optical system for simultaneously generating plural laser beams, the temperature differs between portions near the light sources, the refractive index of the lens for providing predetermined optical properties to a laser beam emitted from each light source will vary when the ambient conditions, in particular, temperature, vary, whereby the laser beams will have different diameters on the photosensitive drums. Accordingly, the scanning lines have different thicknesses, which will adversely affect the quality of an image.

To prevent such degradation of image quality, it is necessary to suppress the range of variations in the beam-spot on the photosensitive drum to 20% or less.

The finite focus lens has its focal distance varied due to a change in temperature. In particular, a change in the focal distance of the finite focus lens for converting a divergent beam from a semiconductor laser element, to a converged beam may well cause a change in the position of the image surface or cause aberration.

The collimator lens cannot convert a divergent beam to a parallel beam due to the change in temperature, causing a change in the position of the image surface or causing aberration.

Supposing that the distance between the light emission point of the semiconductor laser element and the front-side principal point of the finite focus lens is $L_{G1}$, the distance between the rear-side principal point of the lens and the image surface is $L_{G2}$, and the focal distance of the lens is f, the following equation is established (the front side indicates a side closer to the light source, and the rear side indicates a side closer to the image surface):

$$\frac{1}{f} = \frac{1}{L_{G1}} + \frac{1}{L_{G2}} \quad (1)$$

Changes in $L_{G1}$ and $L_{G2}$ due to a change df in the focal distance f can be obtained by differentiating the equation (1) as expressed in the following equation:

$$\frac{df}{f^2} = \frac{dL_{G1}}{L_{G1}^2} + \frac{dL_{G2}}{L_{G2}^2} \quad (2)$$

The conditions where $L_{G2}$ will not vary can be obtained by setting $dL_{G2}=0$, i.e. by the following equation:

$$dL_{G1} = \left(\frac{L_{G1}}{f}\right)^2 df \quad (3)$$

A focal distance change df due to a temperature change dT can be obtained by a thin-lens approximation formula for a single lens as follows:

$$\frac{1}{f} = (n_0 - 1)\left(\frac{1}{r_1} - \frac{1}{r_2}\right) \quad (4)$$

where $r_1$ represents the radius of curvature of the beam entrance plane (i.e. the first plane) of the lens located on its front side, $r_2$ the radius of curvature of the beam exit plane (i.e. the second plane) of the lens located on its rear side, and no the refractive index of the lens.

From equation (4), the following equation is given:

$$-\frac{1}{f^2}\frac{\partial f}{\partial T} = \frac{\partial}{\partial T}\left\{(n_0 - 1)\left(\frac{1}{r_1} - \frac{1}{r_2}\right)\right\} \quad (5)$$

$$= \frac{\partial n_0}{\partial T}\left(\frac{1}{r_1} - \frac{1}{r_2}\right) + (n_0 - 1)\left(-\frac{1}{r_1^2}\frac{\partial r_1}{\partial T} + \frac{1}{r_2^2}\frac{\partial r_2}{\partial T}\right)$$

If the linear expansion coefficient of the lens is $\alpha_G[/^\circ C.]$, the following equation is given:

$$\frac{1}{r_1}\frac{\partial r_1}{\partial T} = \frac{1}{r_2}\frac{\partial r_2}{\partial T} = \alpha_G \quad (6)$$

From equation (6), equation (5) can be modified as follows:

$$-\frac{1}{f^2}\frac{\partial f}{\partial T} = \left(\frac{1}{r_1} - \frac{1}{r_2}\right)\left\{\frac{\partial n_0}{\partial T} - (n_0 - 1)\alpha_G\right\} \quad (7)$$

$$= \frac{1}{f}\left\{\frac{1}{n_0 - 1}\frac{\partial n_0}{\partial T} - \alpha_G\right\}$$

where $\partial n_0/\partial T$ represents a refractive index change due to a temperature change. This refractive index change includes the refractive index change of the lens material itself and a refractive index change due to a change in the wavelength of the semiconductor laser element. In light of this, the following equation is given if the refractive index of the lens material is rewritten as n, and the wavelength of the semiconductor laser element is $\lambda$:

$$\frac{\partial n_0}{\partial T} = \frac{\partial n}{\partial T} + \frac{\partial n}{\partial \lambda}\frac{\partial \lambda}{\partial T} \quad (8)$$

Equation (7) can be revised as follows:

$$df = -\frac{f}{n-1}\left(\frac{\partial n}{\partial T} + \frac{\partial n}{\partial \lambda}\frac{\partial \lambda}{\partial T}\right)dT + \alpha_G f\, dT \quad (9)$$

From equation (9), the relationship between df and dT is obtained. From equations (3) and (9), the following equation is obtained:

$$dL_{GI} = \frac{L_{GI}^2}{f}\left\{-\frac{1}{n-1}\left(\frac{\partial n}{\partial T} + \frac{\partial n}{\partial \lambda}\frac{\partial \lambda}{\partial T}\right) + \alpha_G\right\}dT \quad (10)$$

The temperature change dT can be compensated by varying $L_{G1}$ by $dL_{G1}$ so as to satisfy equation (10). In this case, $dL_{G1}$ and df have an approximately linear relationship. Therefore, $dL_{G1}$ can be varied so as to compensate a focal point shift, using thermal expansion of the holder of the lens unit which integrally fixes the semiconductor laser element and the finite focus lens.

Supposing that the linear expansion coefficient of the holder is au and the expansion of the holder due to the temperature change dT is $dL_{u1}$, the following equation is established:

$$dL_{u1} = \alpha_u L_{G1} dT \quad (11)$$

If the main-scanning directional and sub-scanning directional axial magnifications of the entire optical system are Km and Ks, changes ΔZm and ΔZs in the positions of the beam waists on the image surface are expressed as follows:

$$\Delta Z_m = K_m|d\,L_{GI} - d\,L_{uI}| \quad (12)$$
$$= K_m\left[\frac{L_{GI}}{f}\left\{-\frac{1}{n-1}\left(\frac{\partial n}{\partial T} + \frac{\partial n}{\partial \lambda}\cdot\frac{\partial \lambda}{\partial T}\right) + \alpha_G\right\} - \alpha_u\right]L_{GI}dT$$

$$\Delta Z_s = K_s|d\,L_{GI} - d\,L_{uI}| \quad (13)$$
$$= K_s\left[\frac{L_{GI}}{f}\left\{-\frac{1}{n-1}\left(\frac{\partial n}{\partial T} + \frac{\partial n}{\partial \lambda}\cdot\frac{\partial \lambda}{\partial T}\right) + \alpha_G\right\} - \alpha_u\right]L_{GI}dT$$

Moreover, supposing that the radius of the beam at a distance Z from the beam waist position is ω, the radius of the beam waist is $\omega_0$, and the wavelength of the beam emitted from the semiconductor laser element is λ, the following equation is given:

$$\omega^2 = \omega_o^2\left[1 + \left(\frac{\lambda Z}{\pi \omega_o^2}\right)^2\right] \quad (14)$$

The following equation is obtained by modifying equation (14):

$$Z^2 = \frac{\pi^2 \omega_o^2}{\lambda^2}(\omega^2 - \omega_o^2) \quad (15)$$

The value of Z assumed when the beam radius ω increases by 20% is given by setting $\omega = 1.2\,\omega_0$, using the following equation:

$$Z = 2.083\frac{\omega_o^2}{\lambda} \quad (16)$$

Concerning the temperature of the optical system, the temperature range of 10–60° C. suffices. In other words, $|dt| \leq 30°$ C. suffices as the range of temperature change.

Supposing that the main-scanning directional and the sub-scanning directional beam radiuses at the ordinary temperature are ωm and ωs, respectively, and dt=30° C., the conditions for preventing degradation of the quality of an image are expressed as follows, from equations (12), (13) and (15) in light of the fact that the beam waist position is situated substantially on the photosensitive drum:

$$\left|K_m\left[\frac{L_{GI}}{f}\left\{-\frac{1}{n-1}\left(\frac{\partial n}{\partial T} + \frac{\partial n}{\partial \lambda}\cdot\frac{\partial \lambda}{\partial T}\right) + \alpha_G\right\} - \alpha_u\right]L_{GI}\right| \leq 0.0694\frac{\omega_m^2}{\lambda} \quad (A)$$

$$\left|K_s\left[\frac{L_{GI}}{f}\left\{-\frac{1}{n-1}\left(\frac{\partial n}{\partial T} + \frac{\partial n}{\partial \lambda}\cdot\frac{\partial \lambda}{\partial T}\right) + \alpha_G\right\} - \alpha_u\right]L_{GI}\right| \leq 0.0694\frac{\omega_s^2}{\lambda} \quad (B)$$

If the focal distance f of the finite focus lens, the distance $L_{G1}$ between the semiconductor laser element and the finite focus lens, the refractive index n of the finite focus lens, the linear expansion coefficients $\alpha_G$ and $\alpha_U$ of the finite focus lens and the holder, the oscillation wavelength λ of the semiconductor laser element, the main-scanning directional and sub-scanning directional axial magnifications Km and Ks of the entire optical system, and the main-scanning directional and sub-scanning directional beam radiuses ωm and ωs of the entire optical system are set so as to satisfy the above equations (A) and (B), changes in the focal distance of the finite focus lens, which may well occur due to variations in ambient conditions, can be canceled since thermal expansion of the holder which integrally contains the semiconductor laser element and the finite focus lens varies the distance between the semiconductor laser element and the finite focus lens.

Further, when $L_{G1}=f$ in equation (1), $L_{G2}$ is an infinite value and the exiting beam becomes a parallel beam. That is, $L_{G2}=\infty$ indicates a case of collimator lens. Equation (2) et seq. can be used to deal with the collimator lens. If, in this case, equation (A) and (B) are satisfied, the resultant image is free from degradation.

Therefore, even when the temperature of the apparatus increases after it is operated, or even when the apparatus is operated at a low temperature, the radius of the beam spot is stabilized on the photosensitive drum. In particular, in the multi-beam optical system, the range of thickness variations of scanning lines resulting from radius variations of the beams can be minimized, and hence an image of high quality and resolution be obtained.

An example of an optical system which satisfies the above equations (A) and (B) will be described, using a comparative optical system which does not satisfy the equations, as well as the former system.

A first optical system which satisfies the equations (A) and (B) is constructed as follows:

Focal distance f of the finite focus lens=16.7 mm

Distance $L_{G1}$ between the semiconductor laser element and the finite focus lens=18.2 mm Refractive index n of the finite focus lens=1.798

Linear expansion coefficient $\alpha_G$ of the finite focus lens= $73*10^{-7}/°$ C.

Linear expansion coefficient $\alpha_U$ of the holder=$21*10^{-6}/°$ C.

$\partial n/\partial T = 4.7*10^{-6}/°$ C.

$\partial n/\partial \lambda = -7.768*10^{-5}/nm$ $\partial \lambda/\partial T = 0.2$ nm/° C.

Oscillation wavelength λ of the semiconductor laser element=670 nm

Main-scanning directional axial magnification Km of the entire optical system=712

Sub-scanning directional axial magnification Ks of the entire optical system=97

Main-scanning directional beam radius ωm of entire optical system=25 μm

Sub-scanning directional beam radius ωs of entire optical system=27.5 μm

In the first optical system, the holder 91 of the finite lend unit 90 is made of aluminum. Further, the finite focus lens 9 of the finite lens unit 91 is made of the same material, i.e. PMMA, as the lens material of the post-deflection optical system.

Further, a second optical system which satisfies equation (B) but not equation (A) is constructed as follows:

Focal distance f of the finite focus lens=16.7 mm

Distance $L_{G1}$ between the semiconductor laser element and the finite focus lens=18.2 mm Refractive index n of the finite focus lens=1.798

Linear expansion coefficient $\alpha_G$ of the finite focus lens= $73*10^{-7}/°$ C.

Linear expansion coefficient $\alpha_U$ of the holder=$30*10^{-6}/°$ C.

$\partial n/\partial T = 4.7*10^{-6}/°$ C.

$\partial n/\partial \lambda = -7.768*10^{-5}$/nm $\partial \lambda/\partial T = 0.2$ nm/° C.

Oscillation wavelength λ of the semiconductor laser element=670 nm

Main-scanning directional axial magnification Km of the entire optical system=712

Sub-scanning directional axial magnification Ks of the entire optical system=97

Main-scanning directional beam radius ωm of entire optical system=25 μm

Sub-scanning directional beam radius ωs of entire optical system=27.5 μm

In the second optical system, the holder 91 of the finite lend unit 90 is made of zinc alloy. Further, the finite focus lens 9 of the finite lens unit 91 is made of the same material, i.e. PMMA, as the lens material of the post-deflection optical system.

Figure 4D:
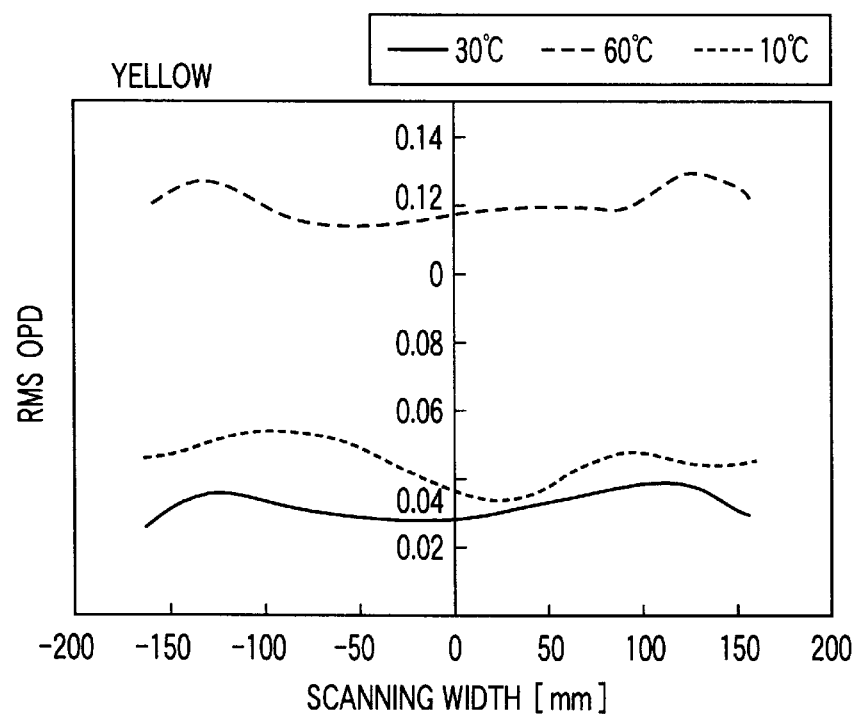
Figure 5A:
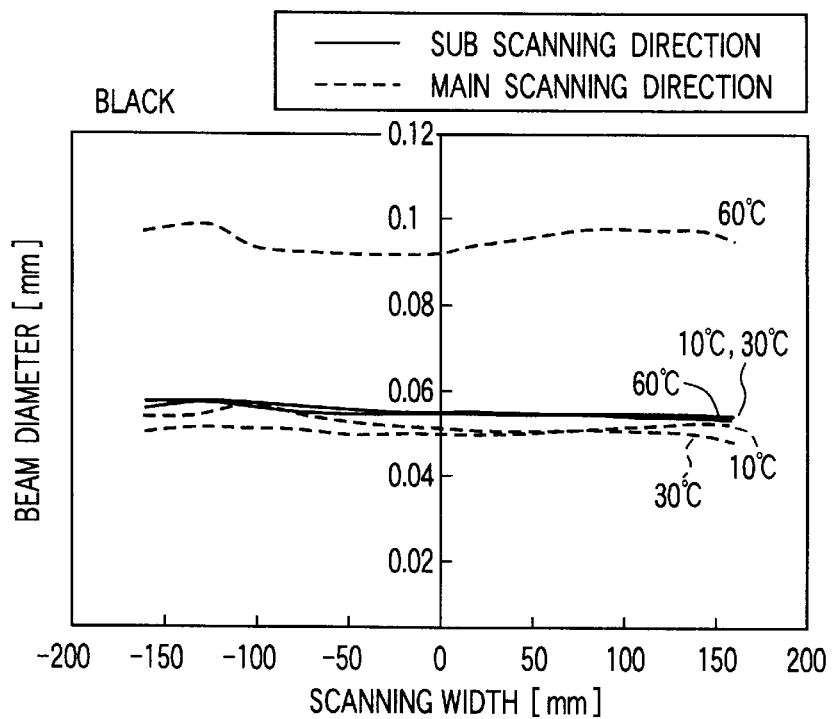
FIGS. 5A–5D are views, useful in explaining beam-spot diameters on the image surface of the second optical apparatus as the comparative.
Figure 5B:
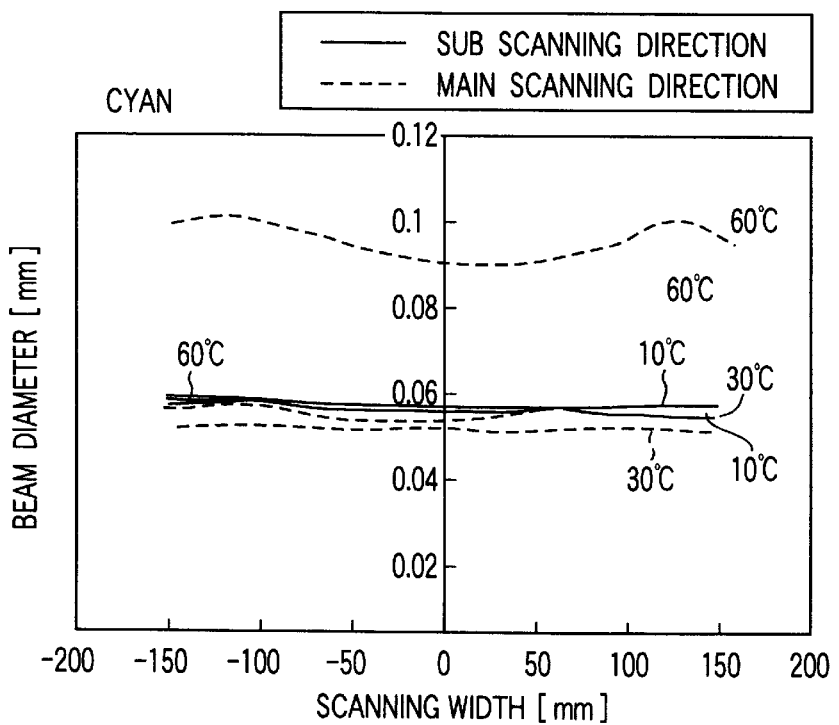
Figure 5C:
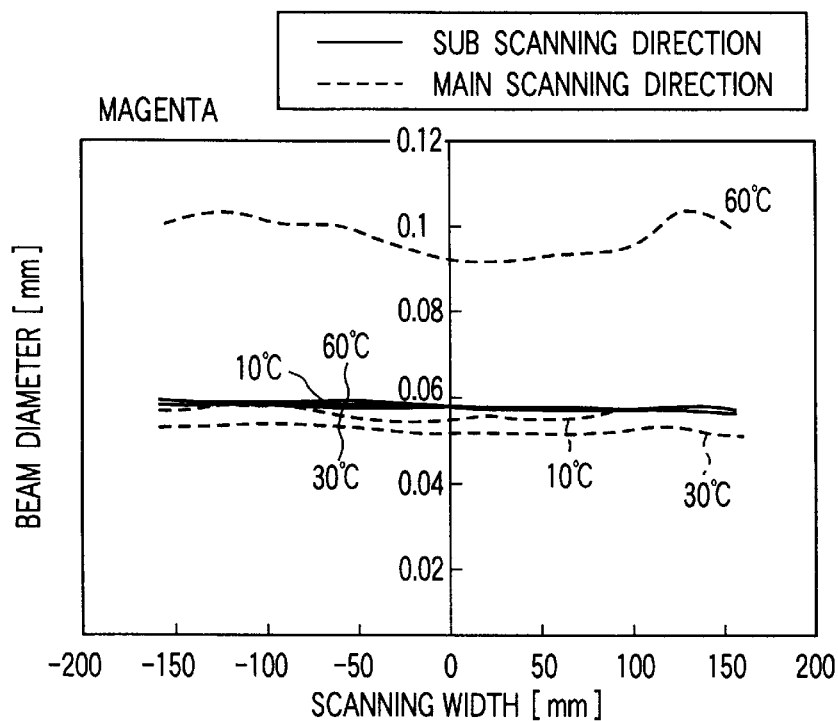
Figure 5D:
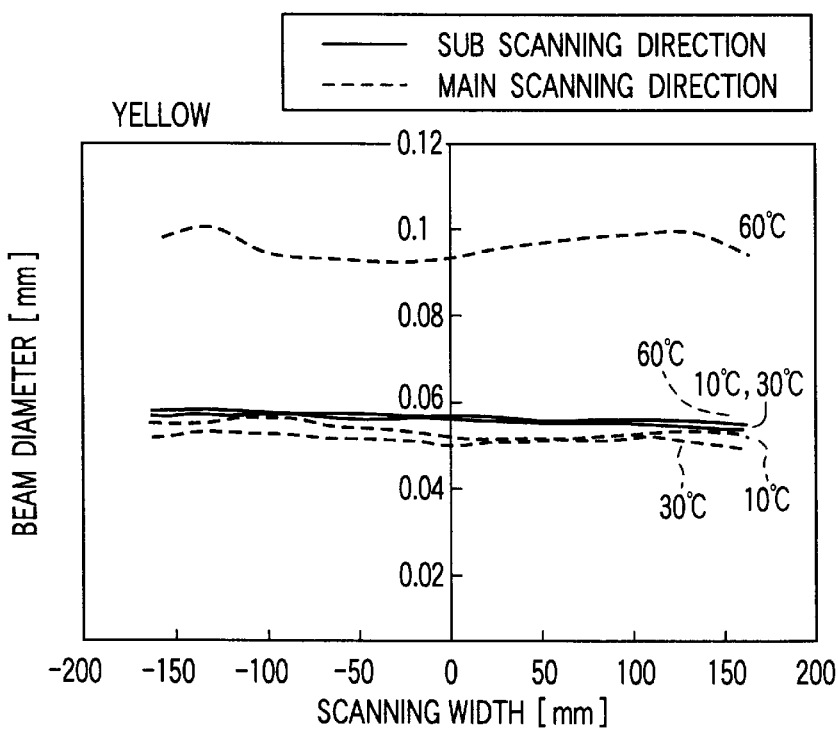

The wave front aberration at each of the image surfaces of the first and second optical systems was calculated. FIGS. 4A–4D illustrate calculation results concerning the wave front aberration of each color component beam at the image surface of the second optical system. In FIGS. 4A–4D, the abscissa indicates scanning width, and point O of the ordinate indicates a position in which the deflection angle is 0°. The calculation results are expressed in the form of square roots concerning wave front aberration values (i.e. in the form of standard deviation (RMS OPD) values) as aberration estimation values of one type. The standard deviation will be referred to simply as "wave front aberration". FIGS. 5A–5D illustrate calculation results of beam-spot diameters on the image surface of the second optical system.

Figure 6A:
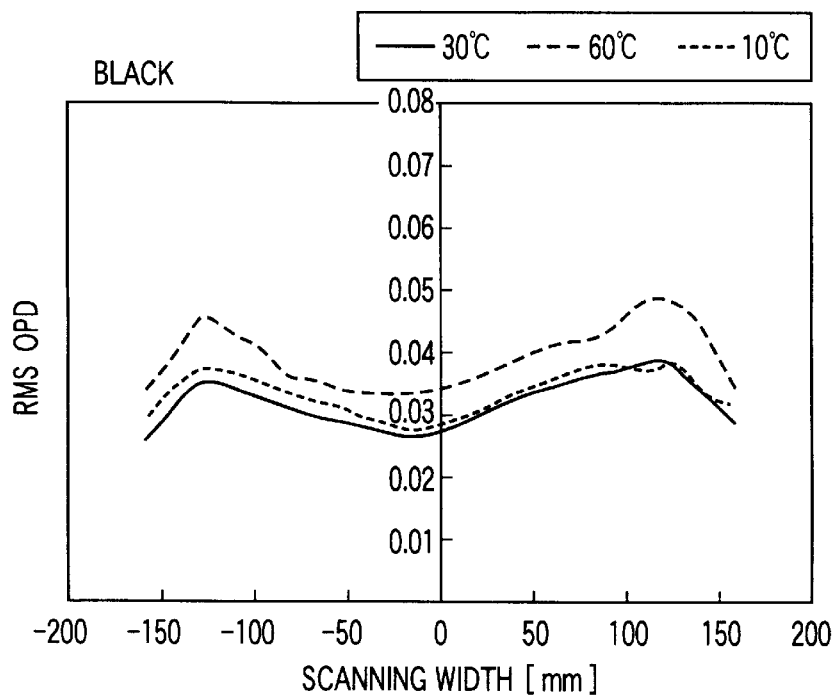
FIGS. 6A–6D are views, useful in explaining calculation results of wave front aberrations on the image surface of a first optical apparatus according to the embodiment of the invention.
Figure 6B:
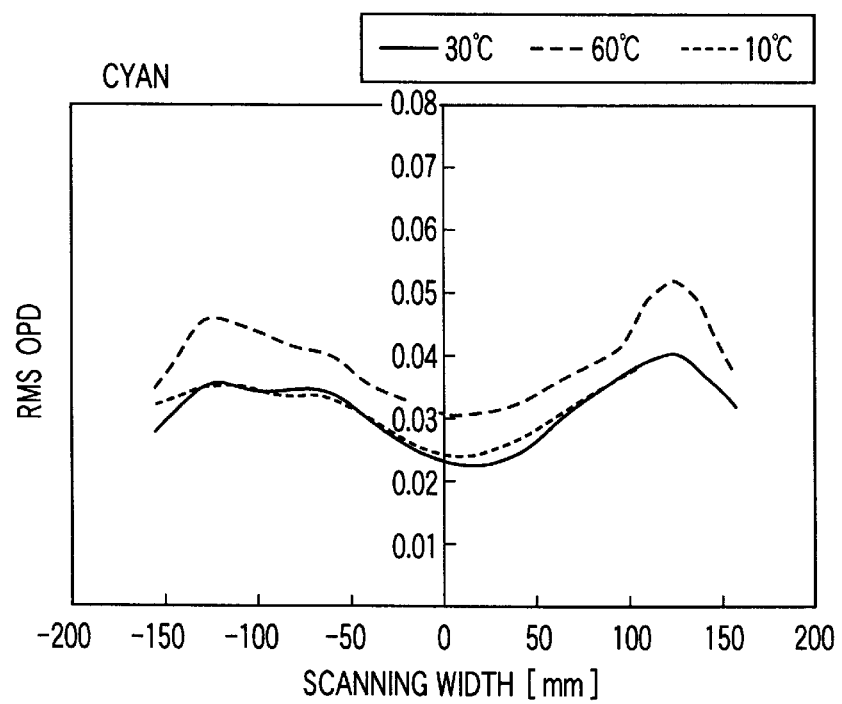
Figure 6C:
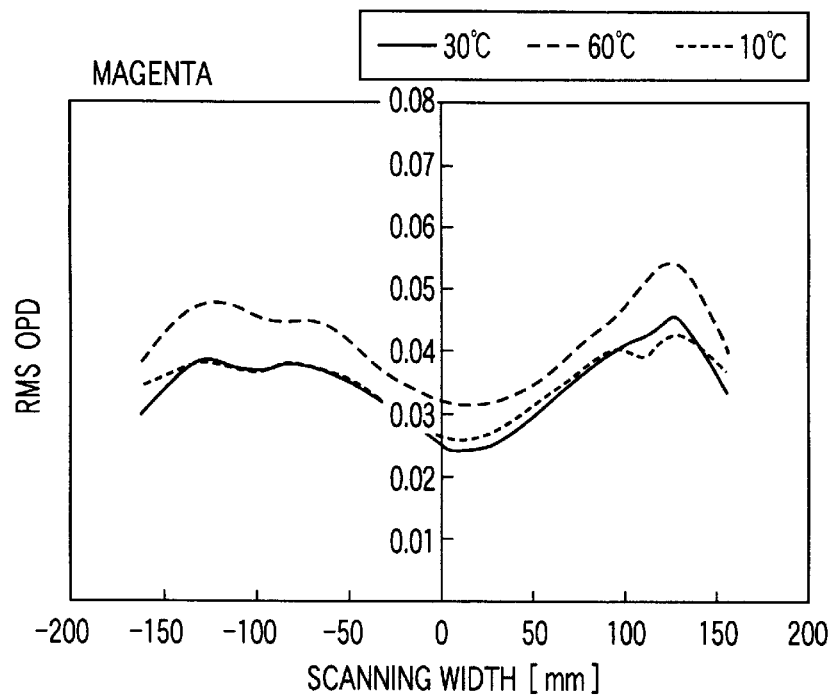
Figure 6D:
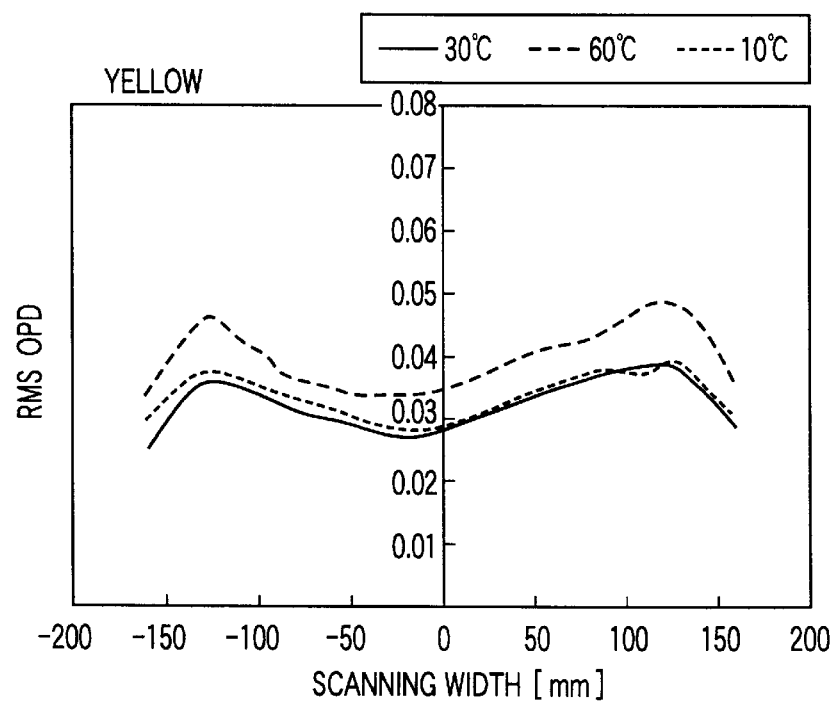
Figure 7A:
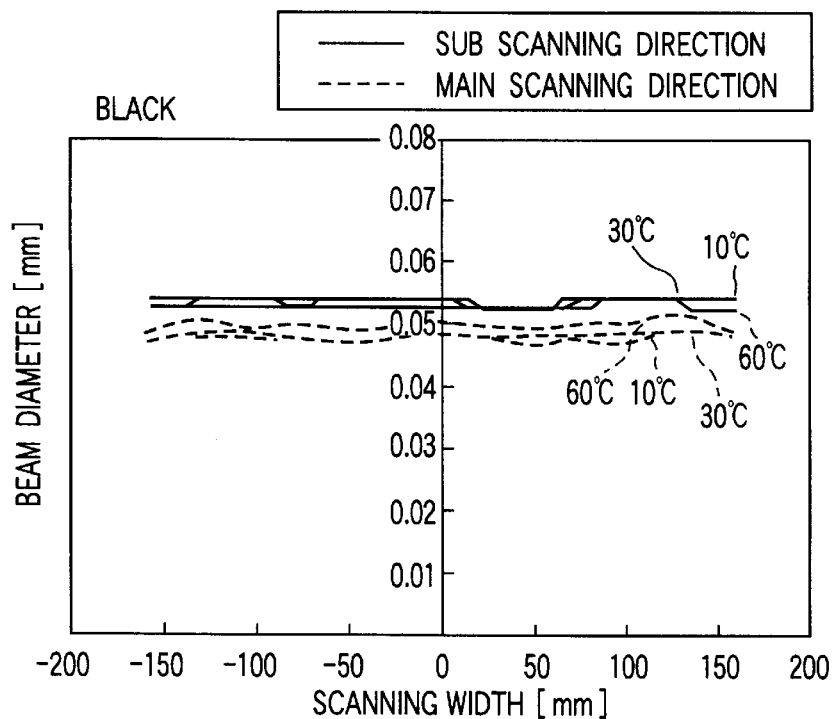
FIGS. 7A–7D are views, useful in explaining beam-spot diameters on the image surface of the first optical apparatus according to the embodiment of the invention.
Figure 7B:
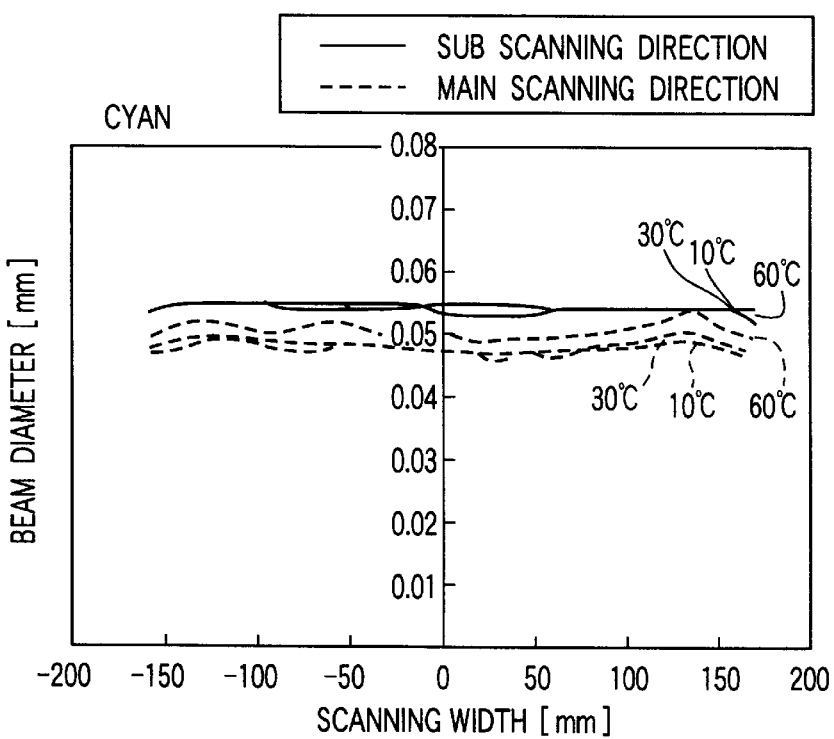
Figure 7C:
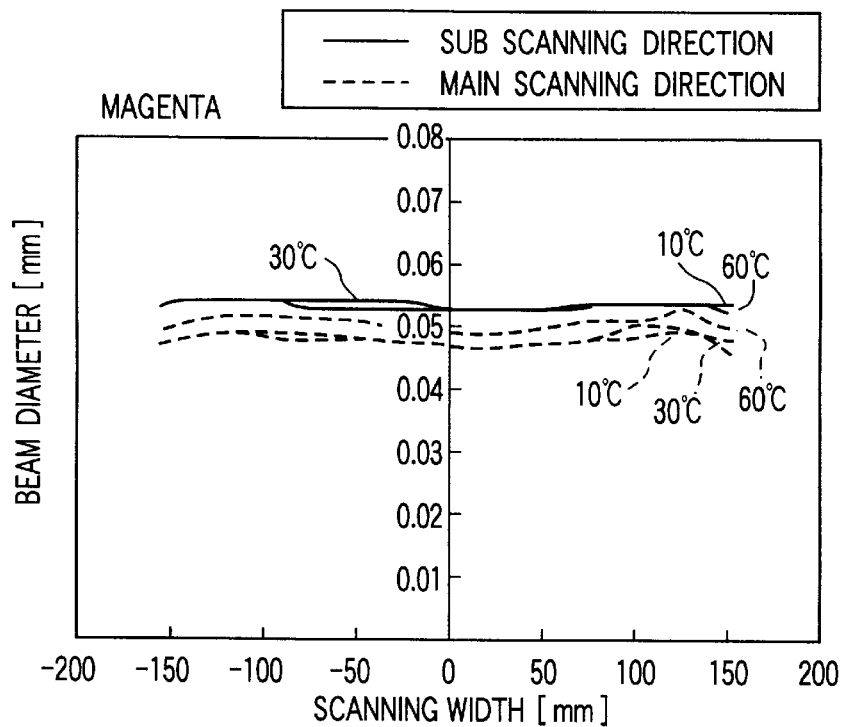
Figure 7D:
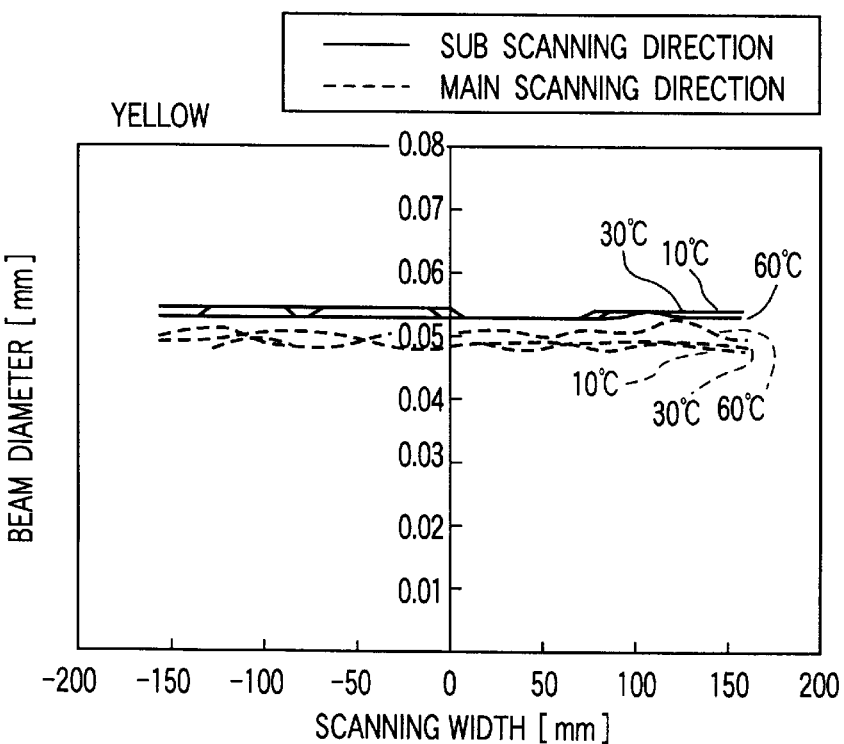

FIGS. 6A–6D show calculation results concerning the wave front aberration of each color component beam at the image surface of the first optical system. FIGS. 7A–7D illustrate calculation results of beam-spot diameters on the image surface of the first optical system.

In the above measurements, the wave front aberration was measured when the image surface is at an ordinary temperature of 30° C., at a high temperature of 60° C., and at a low temperature of 10° C. In FIGS. 5A–5D through 7A–7D, the beam diameters were calculated in each of the main-scanning direction and the sub-scanning direction.

A wave front aberration less than λ/14 (=0.0714λ) is generally considered tolerable from the Marechal criterion.

In the case of the second optical system shown in FIGS. 4A–4D, the wave front aberration is 0.1λ or more at a high temperature. Specifically, it is understood from those figures that the wave front aberration at the temperature of 60° C. is higher by 0.08λ or more than at the temperature of 30° C. FIGS. 5A–5D show beam-spot diameters at the temperature of 30° C., and those when the temperature decreases to 10° C. and increases to 60° C. As is evident from FIGS. 5A–5D, there is little difference in beam-spot diameter in the sub-scanning direction since the condition formula (B) are satisfied in this direction. In the main-scanning direction, however, the beam-spot diameter increases by 0.04 mm (40 μm) at the high temperature of 60° C. This means that in the second optical system which does not satisfy the equation (A), the wave front aberration exceeds the allowable value, thereby increasing the beam-spot diameter on the image surface and adversely affecting the quality of a resultant image.

On the other hand, in the first optical system of FIGS. 6A–6D, variations in wave front aberration due to a temperature change fall within an allowable range. FIGS. 7A–7D show beam-spot diameters at the temperature of 30° C., and those when the temperature decreases to 10° C. and increases to 60° C. As is evident from FIGS. 7A–7D, the wave front aberration at the temperature of 30° C. is substantially equal to that at the temperature of 10° C. or 60° C. This means that variations in beam-spot diameter on the image surface due to temperature changes are compensated. Thus, the first optical system which satisfies the equations (A) and (B) can minimize variations in beam-spot diameter on the image surface, and hence form images of a high quality and resolution on the photosensitive drums.

As described above, in the optical apparatus of the invention, the semiconductor laser element as a light source and the finite focus lens (or the collimator lens) as a first optical member are integrally held in the holder as holding means. The holder is made of a material such as aluminum having an expansion coefficient which can cause change of the distance between the semiconductor laser element and the finite focus lens so as to correct a change in the focal distance of the finite focus lens due to a temperature change. When ambient conditions have changed, especially when the temperature has changed, the holder made of the material can correct a shift in the image forming position of the finite focus lens due to a temperature change by changing the distance between the semiconductor laser element and the finite focus lens by the amount corresponding to the temperature change.

Changes in the focal distance of the finite focus lens, which may well occur due to variations in ambient conditions, can be canceled since thermal expansion of the holder, which is made of a material having an appropriate linear expansion coefficient and integrally contains the semiconductor laser element and the finite focus lens, varies the distance between the semiconductor laser element and the finite focus lens. As a result, variations in the beam-spot diameter on the image surface due to changes in ambient conditions can be suppressed, thereby enabling formation of images of a high quality and resolution on the photosensitive drums.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An optical apparatus comprising:
   a light source for emitting a divergent beam;
   a first optical member for converting the divergent beam to a convergent beam or a parallel beam;
   holding means for integrally holding the light source and the first optical member;
   a second optical member for converging the beam from the first optical member in a first direction;
   deflecting means including a plurality of rotatable reflecting surfaces for deflecting the beam having passed the second optical member to those portions of a predetermined image surface, which are situated in a second direction perpendicular to the first direction; and
   image forming means for causing the beam deflected by the deflecting means to scan the predetermined image surface at a constant speed;
   wherein the following equations are satisfied:

$$\left| K_m \left[ \frac{L_{G1}}{f} \left\{ -\frac{1}{n-1} \left( \frac{\partial n}{\partial T} + \frac{\partial n}{\partial \lambda} \cdot \frac{\partial \lambda}{\partial T} \right) + \alpha_G \right\} - \alpha_u \right] L_{G1} \right| \leq 0.0694 \frac{\omega_m^2}{\lambda} \quad (A)$$

$$\left| K_s \left[ \frac{L_{G1}}{f} \left\{ -\frac{1}{n-1} \left( \frac{\partial n}{\partial T} + \frac{\partial n}{\partial \lambda} \cdot \frac{\partial \lambda}{\partial T} \right) + \alpha_G \right\} - \alpha_u \right] L_{G1} \right| \leq 0.0694 \frac{\omega_s^2}{\lambda} \quad (B)$$

where
f represents a focal distance of the first optical member, $L_{G1}$ a distance between the light source and a front-side principal point of the first optical member, n a refractive index of the first optical member, $\alpha_G$ a linear expansion coefficient of the first optical member due to a temperature change, $\alpha_U$ linear expansion coefficient of the holding means due to a temperature change, λ a wavelength of the light source, Km a second directional axial magnification of the entire optical apparatus, Ks a first directional axial magnification of the entire optical apparatus, ωm a second directional beam radius on the predetermined image surface of 30° C., and ωs a first directional beam radius on the predetermined image surface of 30° C.

2. An optical apparatus comprising:
   a number N of light sources for emitting divergent beams;
   a number N of first optical members for converting the divergent beams to convergent beams or a parallel beam;
   a number N of holding means each for integrally holding an associated one of the light sources and an associated one of the first optical members;
   a number N of second optical members for converging the beams from the first optical members in a first direction;
   single deflecting means including a plurality of rotatable reflecting surfaces for deflecting each of the beams having passed the second optical members to those portions of a predetermined image surface, which are situated in a second direction perpendicular to the first direction; and
   single image forming means for causing the beams deflected by the deflecting means to scan the predetermined image surface at a constant speed;
   wherein the following equations are satisfied:

$$\left| K_m \left[ \frac{L_{G1}}{f} \left\{ -\frac{1}{n-1} \left( \frac{\partial n}{\partial T} + \frac{\partial n}{\partial \lambda} \cdot \frac{\partial \lambda}{\partial T} \right) + \alpha_G \right\} - \alpha_u \right] L_{G1} \right| \leq 0.0694 \frac{\omega_m^2}{\lambda} \quad (A)$$

$$\left| K_s \left[ \frac{L_{G1}}{f} \left\{ -\frac{1}{n-1} \left( \frac{\partial n}{\partial T} + \frac{\partial n}{\partial \lambda} \cdot \frac{\partial \lambda}{\partial T} \right) + \alpha_G \right\} - \alpha_u \right] L_{G1} \right| \leq 0.0694 \frac{\omega_s^2}{\lambda} \quad (B)$$

where
f represents a focal distance of each first optical member, $L_{G1}$ a distance between each light source and a front-side principal point of an associated one of the first optical members, n a refractive index of each first optical member, $\alpha_G$ a linear expansion coefficient of each first optical member due to a temperature change, $\alpha_U$ linear expansion coefficient of each holding means due to a temperature change, λ a wavelength of each light source, Km a second directional axial magnification of the entire optical apparatus, Ks a first directional axial magnification of the entire optical apparatus, ωm a second directional beam radius on the predetermined image surface of 30° C., and ωs a first directional beam radius on the predetermined image surface of 30° C.

3. An optical apparatus according to claim 2, wherein each holding means is made of a material having a linear expansion coefficient which can cause change of a distance between an associated one of the light sources and an associated one of the first optical members so as to correct a change in the focal distance of the associated one of the first optical members.

4. An optical apparatus according to claim 2, wherein when there is a change in temperature, each holding means changes a distance between an associated one of the light sources and an associated one of the first optical members by an amount corresponding to the change in temperature, thereby correcting that shift in an image forming position of the associated one of the first optical members, which is caused by the change in temperature.

* * * * *